UNITED STATES PATENT OFFICE.

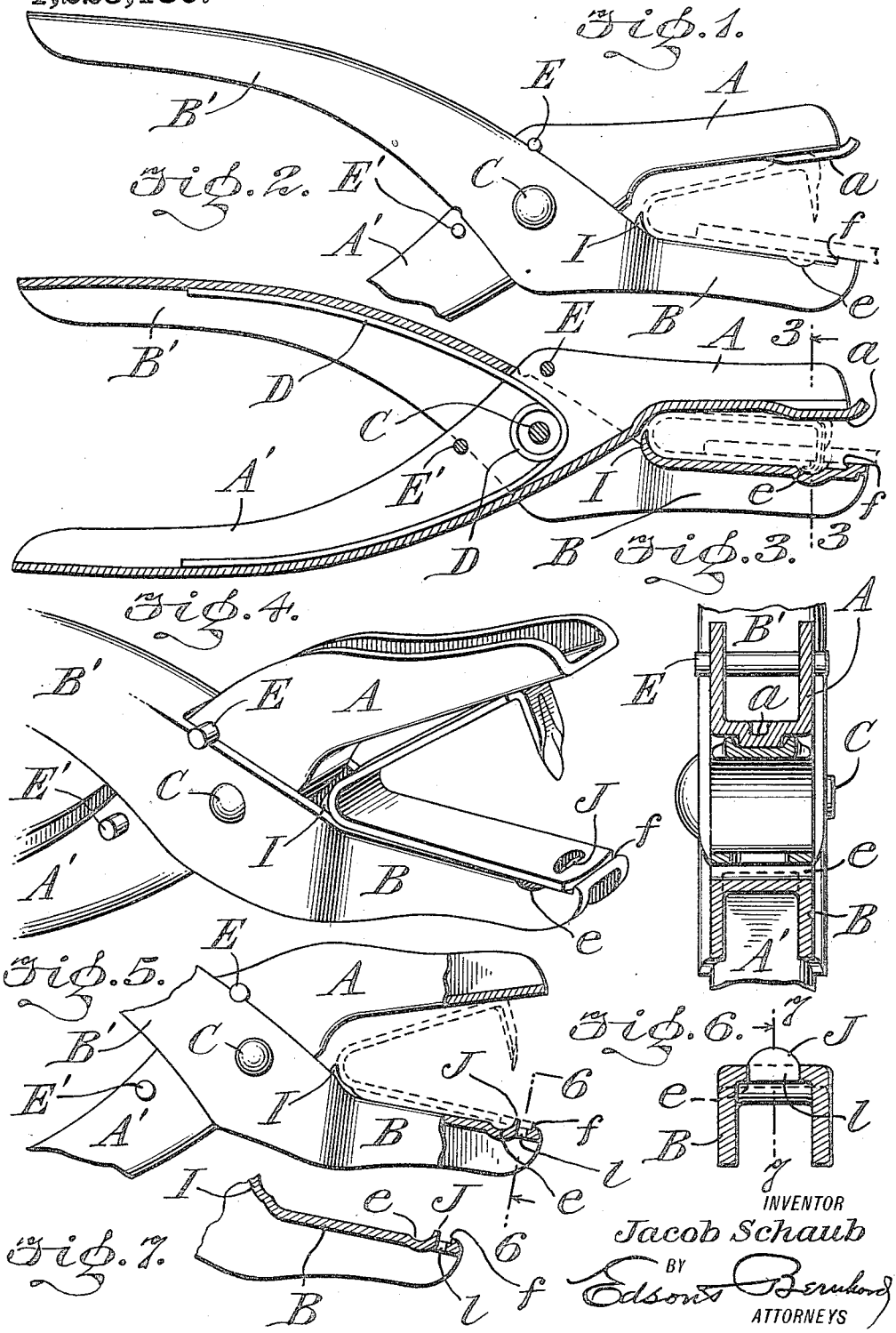

JACOB SCHAUB, OF SALT LAKE CITY, UTAH, ASSIGNOR TO SALT LAKE STAMP CO., OF SALT LAKE CITY, UTAH, A CORPORATION OF UTAH.

IMPLEMENT FOR ATTACHING EAR-TAGS.

1,225,180. Specification of Letters Patent. Patented May 8, 1917.

Original application filed June 1, 1916, Serial No. 101,114. Divided and this application filed August 30, 1916. Serial No. 117,687.

*To all whom it may concern:*

Be it known that I, JACOB SCHAUB, a citizen of the United States, residing at Salt Lake City, county of Salt Lake, and State of Utah, have invented a certain new and useful Implement for Attaching Ear-Tags, of which the following is a specification.

This invention is an implement for attaching to the ear of cattle an identification tag, of one form or another.

The present application is a division of a prior application Serial No. 101,114 filed by me on June 1, 1916.

The implement of this invention is characterized by means for positioning a tag with precision with reference to the bending elements of the implement.

The invention consists, also, in means for retaining the tag securely in position within the implement, whereby the tag cannot slip out of place during the efforts of the operator to apply the tag to the ear of an unruly animal.

Other features and advantages of the invention will appear from the following description taken in connection with the drawing, wherein—

Figure 1 is a side elevation of my implement in an open position, showing one form of tag in position to be applied to an animal's ear.

Fig. 2 is a longitudinal section through the implement showing the position of the tag when it shall have been applied to the ear.

Fig. 3 is a cross section on the line 3—3 of Fig. 2.

Fig. 4 is a perspective view of the new implement one jaw of which is provided with means for effectively retaining a tag in position upon said jaw during and prior to the operation of affixing said tag to the animal's ear, the tag being shown in position upon the jaw.

Fig. 5 is a side elevation with parts in section with a view to showing more clearly the tag retaining means of the implement.

Fig. 6 is a cross section on the line 6—6 of Fig. 5 through one jaw of the tool, the tag being omitted.

Fig. 7 is a longitudinal section through one jaw of the tool, on the line 7—7 of Fig. 6.

One form of my implement for affixing the tag is shown more particularly in Figs. 1, 2 and 3, said construction being intended more particularly as an improvement upon the device disclosed in Patent No. 661,598, granted Nov. 13, 1900 to Callison and Bing, the ownership of which patent and of the present invention is vested in the same party. As shown, the implement embodies crossing jaws A, B, provided with handles A' B', respectively, and pivoted by a pin C, around which pin is coiled a spring D, the end portions of which are positioned within channels of the handles so as to be concealed from view. The movement of one jaw and handle relative to the other jaw is normally arrested by a stop pin E, and when the handles are pressed together the movement of the jaws toward each other is arrested by another stop pin E', see Figs. 1 and 2. As in the Patent 661,598 the jaw B is provided with a curved recess $e$ and with a shoulder $f$ at one side of the recess. The other jaw A is formed with a rib $a$, the same being pressed out of the metal in the operation of blanking up the stock to produce jaw A and its handle A'. The rib extends longitudinally of the jaw A for a part of the length thereof, the width of said rib being less than that of the jaw, as shown in Fig. 3. The rib presents two well defined shoulders intermediate the width of the jaw and extending lengthwise thereof.

When a tag of the form disclosed in my prior application is to be applied to an ear, the jaws A B are in the open position of Fig. 1, and the tag is placed intermediate the jaws for one member of said tag to rest upon jaw B, with an end portion of said tag in contact with the shoulder $f$ and with a slot in said tag over the recess $e$, but the other member of the tag occupies such relation to the jaw A that the rib $a$ of said jaw A fits snugly in the space between certain side ribs of said tag, see Fig. 3, whereby the rib $a$ and the flanges of the tag coöperate in retaining the tag in position between the jaws. When thus positioned the tag cannot be displaced sidewise during the manipulation of the implement, and this is an important feature because an unruly animal will seek to escape, so that the operator is not able at all times to hold the instrument and the attached tag in position when an opportunity presents itself to apply the tag.

There is sufficient space between the end of the prong and the bottom member of the tag to introduce the ear, see Fig. 1, and when the tag is in position it is only necessary for the operator to press the handles A' B' together, whereupon the prong is forced through the ear and the free end of said prong passes through the slot in the tag so as to be deflected by the curved bottom of the recess e, thus upsetting or clenching the end of the prong against the slotted member of the tag, after which the implement is opened and easily withdrawn from the attached tag.

The implement is constructed with a back gage I upon the lower jaw B thereof, said back gage being formed by bending upwardly the metal of the jaw at the rear of that flat face of said jaw the forward part of which is formed with the recess e. Said back gage, I is positioned on the jaw B forwardly of the pivotal connection C between the jaws, and said gage is curved upwardly from the flat face of the jaw, the curvature of the gage corresponding to the bend in the metal of the tag. When the tag is in position upon the flat face of the jaw B, the heel or rear bent portion of said tag is in contact with the back gage, see Fig. 2, and thus the gage I positions the tag with precision upon the jaw B and more particularly with respect to the slot in the tag to the recess e of jaw B.

It is found in practice, however, that there may be, and frequently is, a variation in the length of the slotted member of different tags, due to the action of the dies in bending the metal which compose the tags, and, accordingly, the back gage I on the jaw B does not at all times so coöperate with the different tags that the slots in said tags are in proper register with the recess e in the jaw B. To remedy this, provision is made in the tool as in Figs. 4 to 7 inclusive whereby the slotted part of the tag is brought into register with the recess of the jaw due to the use of a projection J on the jaw entering into the slot of the tag, as a result of which each tag is brought and retained in position for its slot to register with the recess e regardless of the length of the tag and to the contact, or the lack of contact, between the heel of the tag and the back gage I. The positioning projection referred to is a lug or ear J extending upwardly from the face of the jaw B, the same being arranged close to the recess e; in fact, the back wall of the ear or lug J is continuous with the wall of the recess e, as shown more clearly in Figs. 5 and 7, said continuous wall being curved in order that the point of the prong will strike the rear curved wall as said point enters the slot of the tag, whereby the bending of the point commences immediately after said point passes through the flesh of the animal's ear. The ear or lug J is forwardly of the recess e, and as shown said ear or lug is produced by upsetting the metal of the jaw, for which purpose the jaw in front of the ear is perforated as at l in order to supply the metal required to form the ear or lug at the required place.

In using the tag in connection with the implement, said tag is placed upon the jaw B, with the heel of the tag in contact with the back gage I and with the ear or lug J extending into the slot of said tag, the upper forward part of the tag being in contact with jaw A, whereby the lug or ear J with or without the back gage I retains the tag in connected relation to the implement, and in proper position therein against a tendency of the tag to work out of position when the latter is held by the hand in any position. When the handles of the implement are pressed together, the prong of the tag is forced through the flesh of the ear, the point of said prong entering the slot in the tag, at which time the extremity of the prong strikes the curved face or wall continuous with the recess e and lug J, so that the point is deflected as the point passes through the slot, such deflection of the point being continued by contact with the face of the recess e during the application of pressure to the handles of the implement, as a result of which the prong is quickly and effectively clenched against the slotted member of the tag.

Having thus fully described the invention what I claim as new and desire to secure by Letters Patent is:

1. An implement for affixing a cattle tag provided with guide flanges, comprising complemental jaws adapted for movement relatively to each other, one of said jaws being provided with a single positioning rib adapted to coöperate with the guide flanges of the tag, and the other jaw having a working face for clenching one part of the tag relatively to the other part thereof, the width of said single rib being less than the width of the jaw and said single rib being equidistant from the respective side edges of the jaw.

2. An implement of the class described embodying coöperating jaws one of which is provided with a back gage and with a prong deflecting recess positioned forwardly of said back gage, said back gage projecting from the working face of one jaw and intermediate the ends thereof.

3. An implement of the class described embodying coöperating jaws one of which is provided with a prong-deflecting recess and with a positioning projection adjacent said recess, the rear face of said projection being substantially continuous with the forward edge of said recess.

4. An implement of the class described embodying coöperating jaws one of which is provided with a prong deflecting recess and with an upstanding projection forwardly of said recess, the rear face of said projection being substantially continuous with the forward edge of said recess whereby the projection is adapted to enter a slot in the tag.

5. An implement of the class described embodying coöperating jaws one of which is provided with a prong deflecting recess and with an ear or projection the wall of which is curved continuously with reference to a curved face of the recess, said curved wall of the ear or projection being substantially continuous with the curved face of the recess.

6. An implement of the class described embodying coöperating jaws, a back gage on one jaw, a prong deflecting recess on the face of the jaw, and an ear or projection substantially continuous with one edge of said recess and extending upwardly from the face of said jaw.

7. An implement of the class described embodying pivoted jaws, one of said jaws being provided with a back gage which extends from the face of said jaw and is positioned intermediate the ends of the jaw for contact with the heel of a tag.

In testimony whereof, I have hereunto signed my name.

JACOB SCHAUB.

Copies of this patent may be obtained for five cents each, by addressing the "Commissioner of Patents, Washington, D. C."